United States Patent [19]
Usui et al.

[11] Patent Number: 5,678,953
[45] Date of Patent: Oct. 21, 1997

[54] CONNECTING MECHANISM

[75] Inventors: Hidetoshi Usui; Hitoshi Tanaka, both of Tokyo, Japan

[73] Assignee: Asahi Kogaku Kabushiki Kaisha, Tokyo, Japan

[21] Appl. No.: 408,975

[22] Filed: Mar. 23, 1995

[30] Foreign Application Priority Data

Mar. 29, 1994 [JP] Japan ..................... 6-058573

[51] Int. Cl.$^6$ ..................................... F16B 2/20
[52] U.S. Cl. .................. 403/329; 403/316; 359/819; 359/820; 396/545
[58] Field of Search ..................... 403/326, 329, 403/327, 321, 319, 316, 24, 406.1, 407.1, 408.1; 24/297, 662, 324; 354/296; 359/819, 820; 439/357, 352; 285/319, 921

[56] References Cited

U.S. PATENT DOCUMENTS

| | | | |
|---|---|---|---|
| 4,124,859 | 11/1978 | Huber | 354/296 |
| 4,737,017 | 4/1988 | Nagasaka | 359/819 X |
| 4,923,227 | 5/1990 | Petty et al. | 285/319 |
| 5,135,341 | 8/1992 | Leyder | 403/406.1 X |
| 5,381,198 | 1/1995 | Mauchan | 354/296 X |

FOREIGN PATENT DOCUMENTS

| | | | |
|---|---|---|---|
| 511436 | 11/1992 | European Pat. Off. | 285/319 |
| 1223276 | 2/1971 | United Kingdom | 285/921 |

*Primary Examiner*—Harry C. Kim
*Attorney, Agent, or Firm*—Greenblum & Bernstein, P.L.C.

[57] ABSTRACT

In a connecting mechanism which connects two members, one of the two members is provided with an elastically deformable engaging portion, and the other member is provided with a contact surface which is brought into contact with the elastically deformable engaging portion, which is elastically deformed at a front end. The two members are engaged with each other by elastically deforming the elastically deformable engaging portion so that the latter comes into contact with the contact surface. The elastically deformable engaging portion and the contact surface are shaped such that the engagement force of the two members during a connecting operation is stronger than the engagement force when the connecting operation is completed.

15 Claims, 4 Drawing Sheets

5,678,953

1

CONNECTING MECHANISM

BACKGROUND OF THE INVENTION

1. Field of the Invention

The present invention relates to a connecting mechanism which detachably connects two members.

2. Description of Related Art

In a known connecting mechanism which connects two or more members using a resilient force, an engaging surface is made of a single planar surface which comes into contact with a mating engaging portion to hold the two members in a connecting position. The relative engagement angle between the engaging surface and the engaging portion is determined such that no accidental disengagement or disconnection of the two members occurs in the connecting position.

However, if the engagement angle is such that the two members cannot be disconnected by an external force, it is impossible to disengage the two members, for example for repair or upon the occurrence of any troubles, thereby causing great inconvenience. Conversely, if the engagement angle is such that the two members can be easily disconnected by an external force, for the convenience of repair, etc., an accidental disengagement of the two members can take place during normal operation.

SUMMARY OF THE INVENTION

It is an object of the present invention to provide a connecting mechanism which ensures a reliable connection, in addition to enabling an easy disconnection in accordance with need.

To achieve the object mentioned above, according to the present invention, there is provided a connecting mechanism which connects two members (or portions) of first and second members, wherein one of the two members, i.e., the first member, is provided with an elastically deformable engaging portion, and the other member, i.e., the second member, is provided with a contact surface which is brought into contact with the elastically deformable engaging portion, which is elastically deformed at the front end. The two members are engaged with each other by elastically deforming the elastically deformable engaging portion so that the latter comes into contact with the contact surface and the elastically deformable engaging portion and the contact surface are shaped such that the engagement force of the two members during the course of the connecting operation is stronger than the engagement force when the engagement is completed.

Preferably, the elastically deformable engaging portion is comprised of a plurality of elastically deformable legs projecting from the first member, and the contact surface is formed by edges of a plurality of engaging holes formed in the second member, so that the elastically deformable legs are fitted in the engaging holes.

Preferably, the elastically deformable legs are provided with first engaging surfaces which come into contact with the edges of the engaging holes when the engagement of the two members is completed, and second engaging surfaces which come into contact with the edges of the engaging holes in the course of the engagement or disengagement of the two members.

The oblique angles of the first and second engaging surfaces can be different from each other.

In an embodiment, the contact surface is provided with a first engaging surface which comes into contact with a front

2 edge of the elastically deformable engaging portion when the engagement of the two members is completed, and a second engaging surface which comes into contact with a front edge of the elastically deformable engaging portion in the course of the engagement or disengagement of the two members.

In this embodiment, preferably, the elastically deformable engaging portion is comprised of a plurality of elastically deformable legs projecting from the first member, and the first and second engaging surfaces are formed within engaging holes which are formed in the second member, so that the elastically deformable legs can be fitted in the engaging holes.

According to another aspect of the present invention, there is provided a connecting mechanism which connects an end member to an end of a cylindrical member, wherein the cylindrical member is provided on an inner surface thereof with an inner projecting flange which is provided with a plurality of engaging holes. The end member is provided with elastically deformable legs which are fitted in the engaging holes to elastically contact with edges of the engaging holes. The elastically deformable legs are provided with first engaging surfaces which come into contact with the edges of the engaging holes when the engagement of the end member with the cylindrical member is completed. Second engaging surfaces which come into contact with the edges of the engaging holes in the course of the engagement of the end member with the cylindrical member are provided, and the first and second engaging surfaces have oblique angles that are determined such that the engagement force of the end member with the cylindrical member in the course of the connecting operation is stronger than the engagement force when the engagement is completed.

According to still another aspect of the present invention, in a connecting mechanism which connects an end member to an end of a cylindrical member, the cylindrical member is provided, on an inner surface thereof, with an inner projecting flange which is provided with a plurality of engaging holes. The end member is provided with elastically deformable legs which are fitted in the engaging holes. The engaging holes are provided therein with first engaging surfaces which come into contact with a front edge portion of the elastically deformable engaging portion when the engagement of the end member with the cylindrical member is completed, and second engaging surfaces which come into contact with the front edge portion of the elastically deformable engaging member in the course of the engagement or disengagement of the end member with the cylindrical member. The first and second engaging surfaces have oblique angles that are determined such that the engagement force of the end member with the cylindrical member in the course of the connecting operation is stronger than the engagement force when the engagement is completed.

The present disclosure relates to subject matter contained in Japanese Patent Application No. 06-58573 (filed on Mar. 29, 1994) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
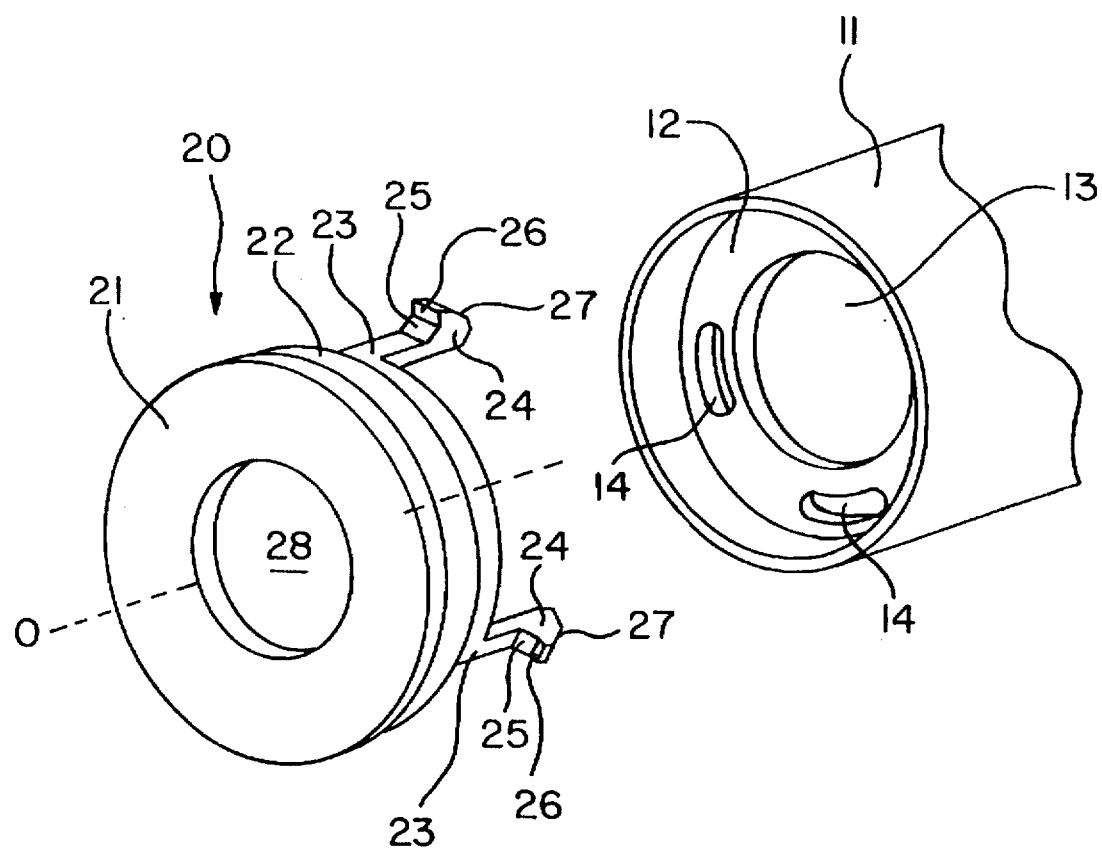
FIG. 1 is a perspective view of a lens barrel of a camera and a lens decoration frame to be attached to a front end of the lens barrel, to which an embodiment of a connecting mechanism is applied, according to the present invention.

In the illustrated embodiments, a connecting mechanism according to the present invention is applied to a connection of a lens decoration frame (end member) 20 to a front end of a lens barrel (cylindrical member) 11. The cylindrical lens barrel 11 is provided with an inner peripheral flange 12 in the vicinity of the front end thereof. The flange 12 defines an opening (aperture) 13 of a front lens group at the inner peripheral edge thereof. The flange 12 is provided with a plurality of engaging holes 14 that are spaced from one another at a predetermined angular distance in the circumferential direction thereof. As is well known, there are lens groups, including a front lens group L, a diaphragm mechanism (not shown), and/or a shutter mechanism (not shown), etc., provided in the lens barrel 11. The lens barrel 11 moves in a direction parallel to the optical axis O or rotates about the optical axis O through a lens accommodating mechanism, a focus adjusting mechanism, or a zoom mechanism.

The lens decoration frame 20, to be attached to the front end of the lens barrel 11, is comprised of a circular decoration frame body 21 having a center lens opening 28, a stepped annular engaging portion 22 projecting from the rear surface 21a of the decoration frame body 21, and a plurality of elastically deformable legs 23 projecting rearwardly from the stepped engaging portion 22. The outer diameter of the outer peripheral surface 22a of the stepped engaging portion 22 is smaller than the outer diameter of the decoration frame body 21, and is substantially identical to the inner diameter of the inner peripheral surface 11b of the lens barrel 11, so that the stepped engaging portion 22 can be tightly fitted in the lens barrel 11.

The elastically deformable legs 23 are integrally formed with the decoration frame body 21 and the stepped engaging portion 22 to correspond to the engaging holes 14. The elastically deformable legs 23 are made of a synthetic resin or a metal plate, so that they can be elastically deformed in the radial directions of the decoration frame 20.

The elastically deformable legs 23 are each provided on the free ends thereof with an engaging projection 24 which projects outwardly from the body of each leg 23. The engaging projections 24 are provided with first and second oblique engaging surface 25 and 26, respectively, that come into contact with inner engaging edges 15 of the engaging holes 14 to prevent the decoration frame 20 from being disengaged from the lens barrel. The first engaging surfaces 25 and the second engaging surfaces 26 have different oblique angles.

Figure 2:
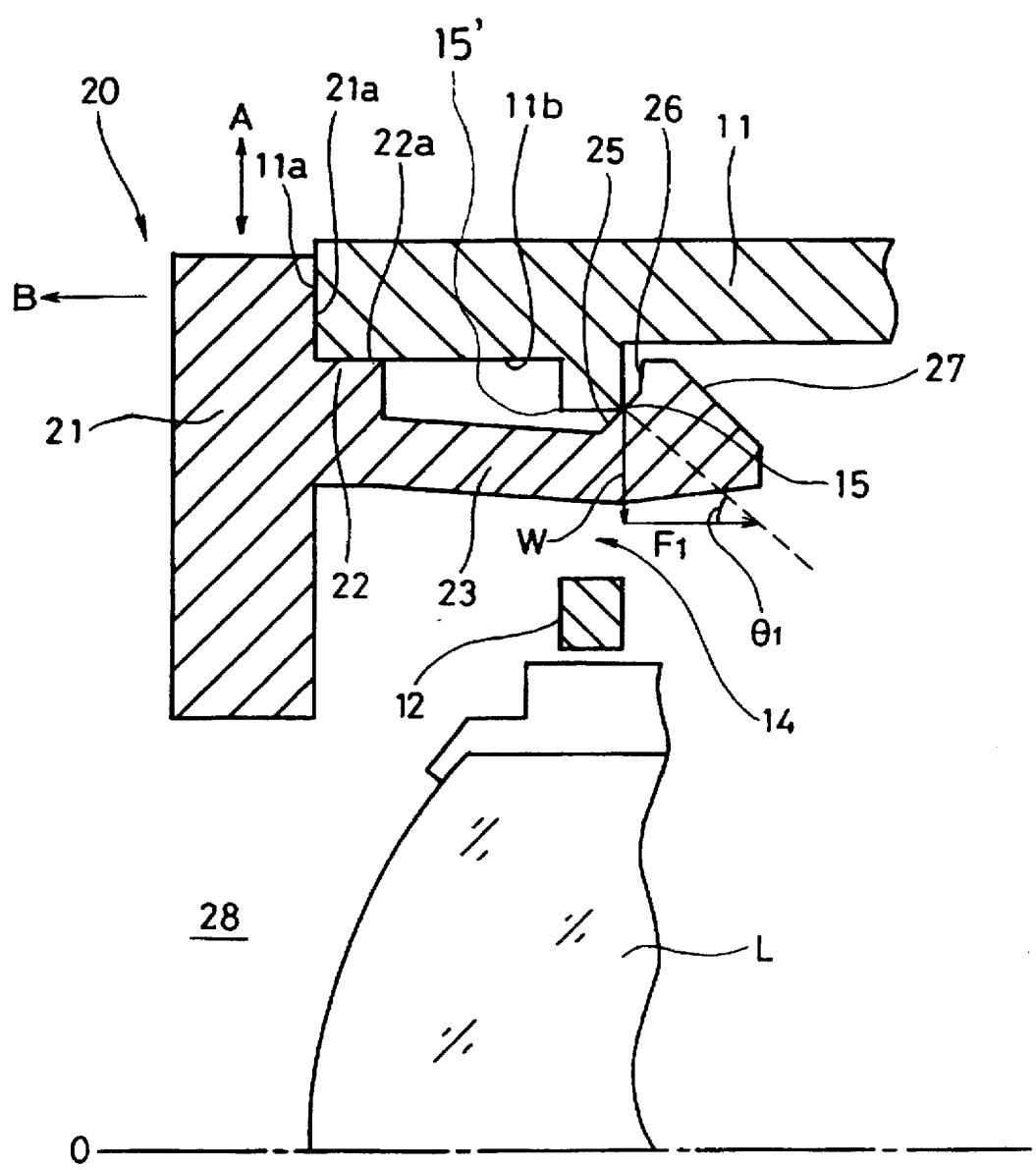
FIG. 2 is an enlarged sectional view of a connecting mechanism when a lens decoration frame is connected to a lens barrel of a camera, according to the present invention.

The first engaging surfaces 25 abut against the engaging edges 15 due to the resilient force of the elastically deformable legs 23 to elastically bias the decoration frame 20 in the connecting direction (i.e., direction against disconnection) in which the rear surface 21a is in close contact with the front end surface 11a of the lens barrel 11 when the decoration frame 20 is completely connected to the lens barrel 11. Note that as can be seen in FIG. 2, an angle θ1 defined between the direction in which the first engaging surface 25 contacts the corresponding engaging edge 15, i.e., a line normal to the first engaging surface 25 at the contact point with the engaging edge 15 and a line parallel with the direction B of the disengagement of the decoration frame 20 from the lens barrel 10, i.e., the line parallel with the axis of the lens barrel 11 is around 45° with respect to the center axis of the annular decoration frame 20 (i.e., optical axis O). The oblique angle of the second engaging surfaces 26 with respect to the center axis of the annular decoration frame 20 is about 80° in a free state of the elastically deformable legs 23. The second engaging surfaces 26 are spaced from the engaging edges 15 when the decoration frame 20 completely engages with the lens barrel 11.

As can be understood from the above discussion, when the decoration frame 20 is attached or connected to the lens barrel 11, the rear surface 21a of the decoration frame body 21 is pressed onto the end surface 11a of the lens barrel 11 and the outer surfaces 22a of the stepped engaging portions 22 tightly contact with the inner surface 11b of the lens barrel 11, due to the elastic restoring force of the elastically deformable legs 23. In this state, even if a strong external force is applied to the decoration frame body 21 in the radial directions "A", no movement of the decoration frame body 21 occurs since the stepped engaging portions 22 engage with the inner peripheral surface 11b of the lens barrel 11, resulting in no disengagement of the decoration frame 20 from the lens barrel 11.

If an external force which is smaller than a predetermined value is applied to the decoration frame 20 in the disengagement direction "B", no movement of the decoration frame 20 takes place due to the contact surface produced between the first engaging surfaces 25 of the elastically deformable legs 23 and the engaging edges 15.

If the external force applied to the decoration frame 20 in the disengagement connection "B" is relatively strong, i.e., above the predetermined value, an elastic deformation of the elastically deformable legs 23 in the inward direction occurs against the resilient restoring force thereof, so that the first engaging surfaces 25 slide and move on the corresponding engaging edges 15 in the direction "B". The movement of the first engaging surfaces 25 continues until the second engaging surfaces 26 come into contact with the engaging edges 15 (first disengagement position, or intermediate disengagement position). In the first disengagement position, there is a gap between the front end surface 11a of the lens barrel 11 and the rear surface 21a of the decoration frame body 21, as shown in FIG. 3.

Figure 3:
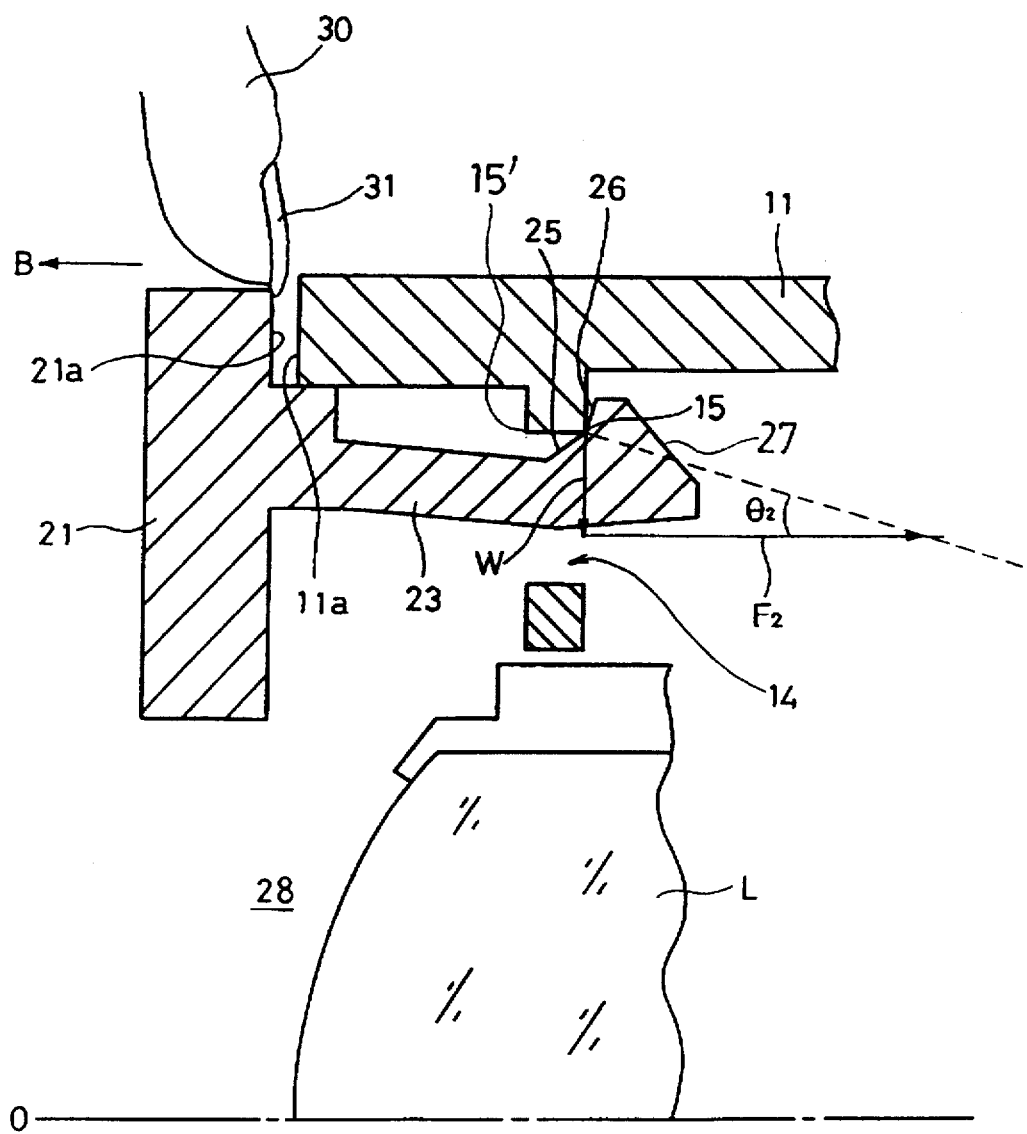
FIG. 3 is an enlarged sectional view of a connecting mechanism in the course of a disconnecting operation of a lens decoration frame from a front end of a lens barrel, according to the present invention; and, FIG. 4 is an enlarged sectional view of a connecting mechanism according to another embodiment of the present invention.

In comparison with the complete engagement position shown in FIG. 2, in which the first engaging surfaces 25 is in contact with the engaging edges 15, and the first disengagement position shown in FIG. 3, in which the second engaging surfaces 26 is in contact with the engaging edges 15, it is assumed that the angles between the line normal to the first and second engaging surfaces 25 and 26 at the contact points with the engaging edges 15 and the disengagement direction "B" are $\theta_1$ and $\theta_2$, respectively; the external force necessary to deform the elastically deformable legs 23 so as to disengage the decoration frame 20 from the lens barrel 11, in FIGS. 2 and 3 is "W"; and, the first and second disengagement forces to be applied to the first and second engaging surfaces 25 and 26 in the direction opposite to the disengagement direction "B" so as to produce the external force "W" are $F_1$ and $F_2$, respectively. Assuming that the frictional force is negligible, the ratio between the first and second disengagement forces $F_1$ and $F_2$ is given by $(1/\tan \theta_1):(1/\tan \theta_2)$. Since the angle $\theta_1$ is larger than the angle $\theta_2$ $(90°>\theta_1>\theta_2>0°)$, the first disengagement force $F_1$ is smaller than the second disengagement force $F_2$ ($F_1<F_2$). Namely, if the external force which is slightly stronger than the first disengagement force $F_1$ is exerted on the decoration frame 20 in the direction "B", the decoration frame 20 is moved until the second engaging surfaces 26 come into contact with the engaging edges 15 at the first disengagement position, but thereafter no further movement of the decoration frame 20 occurs.

In order to move the decoration frame 20 beyond the intermediate disengagement position in the disengagement direction "B" to completely disengage the decoration frame 20 from the lens barrel 11, it is necessary to apply the disengagement force that is considerably larger than the first disengagement force $F_1$, i.e., larger than the second disengagement force $F_2$. Since the decoration frame body 21 is thin, if a photographer (or an operator) tries to withdraw the decoration frame body 21 from the lens barrel 11, while holding the thin decoration frame body 21 with his or her fingers, the fingers have a tendency to slip on the decoration frame body, so that it is difficult for a photographer to exert a force strong enough to withdraw the decoration frame 20 from the lens barrel 11. Consequently, when a photographer holds the decoration frame body 21 with his or her fingers and attempts to take the decoration frame body 20 out of the lens barrel 11 in a normal operation state, the decoration frame body 21 can be moved to the intermediate disengagement position incomplete disengagement position), but it is very difficult to cause a further movement of the decoration frame body 21 beyond the intermediate disengagement position. Thus, if an external force which is produced, for example when another member collides or contacts with the decoration frame body 21 is applied to the decoration frame body 21 in the disengagement direction "B", no accidental disengagement of the decoration frame 11 from the lens barrel 11 takes place.

The decoration frame 20 can be completely disengaged from the lens barrel 11 only when a stronger external force is applied. In the illustrated embodiments, when the external force stronger than the first disengagement force $F_1$ is applied, a gap is produced between the rear surface 21a of the decoration frame 20 and the front end surface 11a of the lens barrel 11, as mentioned above. For instance, an operator inserts his or her fingernail 31 in the gap and moves the decoration frame body 21 away from the lens barrel 11. Hence, the decoration frame 20 can be completely disengaged or withdrawn from the lens barrel 11. Upon withdrawal or removal of the decoration frame from the lens barrel, it is also possible to use a screw-driver (flat-head screwdriver) or a special tool which can be inserted in the gap instead of an operator's fingernail.

As can be seen from the above discussion, no accidental disengagement of the decoration frame 20 from the lens barrel 11 to which the present invention is applied occurs during normal use. To detach the decoration frame 20 from the lens barrel, for example, for the purpose of repair, the decoration frame body 21 is first moved to the first disengagement position (intermediate disengagement position), so that a gap is produced between the decoration frame body 21 and the lens barrel 11. Thereafter, an operator inserts his or her fingernail 31 or a special tool in the gap thus produced and exerts a stronger force on the decoration frame body. Consequently, the decoration body 20 can be completely disengaged from the lens barrel 11.

To attach the decoration frame 20 to the lens barrel 11, the elastically deformable legs 23 are registered (aligned) with the corresponding engaging holes 14 and the decoration frame 20 is inserted in the lens barrel 11. As a result, the inclined surfaces 27 of the decoration frame 20 are pressed against the outer edges 15' of the engaging holes 15, so that the elastically deformable legs 23 are elastically formed inward. When the inclined surfaces 27 ride over and pass the engaging edges 15', the elastically deformable legs 23 that have been inwardly deformed are returned to the initial state due to the elastic restoring force thereof. Consequently, the second engaging surfaces 26 and the first engaging surfaces 25 successively come into sliding contact with the engaging edges 15. Thus, the engagement of the decoration frame 20 with the lens barrel 11 in which the first engaging surfaces 25 are pressed against the engaging edges 15 is established (FIG. 2).

Figure 4:
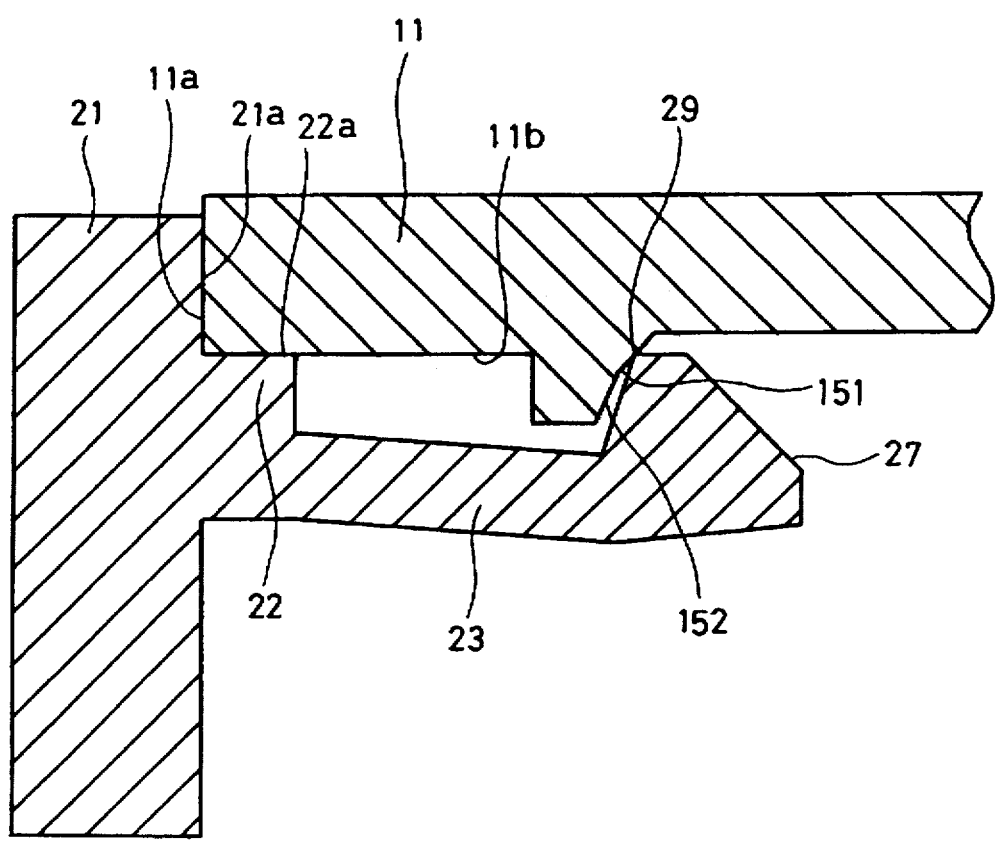

Although the engaging surfaces 25 and 26 having different oblique angles are provided on the elastically deformable legs 23 in the above-mentioned embodiment, it is possible to provide first and second engaging surfaces 151 and 152 having different oblique angles on the lens barrel 11 instead of the decoration frame 20, as shown in FIG. 4. In this embodiment, illustrated in FIG. 4, the engaging projections 29 of the elastically deformable legs 23 come into contact with the first engaging surfaces 151 and the second engaging surfaces 152 when the decoration frame 20 is completely connected to the lens barrel 11 and when the decoration frame 20 is in the intermediate disengagement position (incomplete engagement position), respectively.

Alternatively, it is possible to provide more than two stepped oblique surfaces (engaging surfaces) or oblique engaging surfaces whose oblique angle gradually varies. The present invention can be generally applied to a connecting mechanism in which the connecting force is stronger when the two members are in the course of the connecting or disconnecting operation than when the two members are completely connected.

Although the above discussion has been directed to a connection between a decoration frame and a photographing lens barrel in a camera, the present invention is not limited thereto and can be applied to a connection for other members.

As can be understood from the foregoing, according to the present invention, since the connecting force of the two members when the two members are located in an intermediate connecting position in which there is a gap between the two members is stronger that the connecting force when the connection of the two members is completed, the two members may accidentally and relatively move to the intermediate connecting position during normal use, but little or no further movement of the two members beyond the intermediate connecting position takes place.

To positively separate or disengage the two members, the two members are first relatively moved to the intermediate connecting position in which a gap is produced between the two members, and then an operator inserts his or her fingernail or a special tool in the gap and exerts a stronger force on one of the two members. Consequently, the two members can be separated or disengaged.

We claim:

1. A connecting mechanism which connects two portions of first and second members, comprising:

said first member being provided with a front portion having an elastically deformable engaging portion extending therefrom, and said second member being provided with a contact surface which is brought into contact with a free end of said elastically deformable engaging portion when said engaging portion is elastically deformed;

said first and second members are engaged with each other by elastically deforming said elastically deformable engaging portion so that said engaging portion comes into contact with said contact surface; and said elastically deformable engaging portion and said contact surface are shaped such that an elastic restoring force of said engaging portion when said first and second members are undergoing an operation to connect said first and second members is stronger than when said first and second members are connected; and wherein, when said first and second members are connected, said elastic restoring force biases said front portion of said first member to press against and contact said second member.

2. A connecting mechanism according to claim 1, wherein said elastically deformable engaging portion comprises a plurality of elastically deformable legs projecting from said first member, and wherein said contact surface is formed by edges of a plurality of engaging holes formed in said second member, so that said elastically deformable legs are fitted in said engaging holes.

3. A connecting mechanism according to claim 2, wherein said elastically deformable legs are provided with first engaging surfaces which come into contact with said edges of said engaging holes when said two members are connected, and second engaging surfaces which come into contact with said edges of said engaging holes during engagement and disengagement of said two members.

4. A connecting mechanism according to claim 3, wherein said first and second engaging surfaces have different oblique angles.

5. A connecting mechanism according to claim 1, wherein said contact surface is provided with a first engaging surface which comes into contact with a front edge of said elastically deformable engaging portion when said two members are connected, and a second engaging surface which comes into contact with a front edge of said elastically deformable engaging portion during connection or disconnection of said two members.

6. A connecting mechanism according to claim 5, wherein said first and second engaging surfaces have different oblique angles.

7. A connecting mechanism according to claim 6, wherein said elastically deformable engaging portion comprises a plurality of elastically deformable legs projecting from said first member, and wherein said first and second engaging surfaces constituting said contact surface are formed within engaging holes formed in said second member, so that said elastically deformable legs can be fitted in said engaging holes.

8. A connecting mechanism which connects an end member to an end of a cylindrical member, comprising:

said cylindrical member is provided, on an inner surface, with an inner projecting flange which is provided with a plurality of engaging holes;

said end member is provided with a front portion having elastically deformable legs extending therefrom which are fitted in said engaging holes to elastically contact edges of said engaging holes;

said elastically deformable legs are provided with first engaging surfaces which come into contact with said edges of said engaging holes when said end member and said cylindrical member are connected, and second engaging surfaces which come into contact with said edges of said engaging holes when said end member and said cylindrical member are undergoing an operation to connect; and said first and second engaging surfaces having an oblique angle with respect to each other that are determined such that an elastic restoring force of said elastically deformable legs is stronger when undergoing said operation to connect said end member with said cylindrical member than when said end member and cylindrical member are connected; and wherein, when said end member and said cylindrical member are connected, said elastic restoring force biases said front portion of said end member to press against and contact said cylindrical member.

9. A connecting mechanism which connects an end member to an end of a cylindrical member, comprising:

said cylindrical member is provided, on an inner surface, with an inner projecting flange with is provided with a plurality of engaging holes;

said end member is provided with a front portion having elastically deformable legs projecting therefrom which are fitted in said engaging holes;

said engaging holes are provided with first engaging surfaces which come into contact with a front edge portion of said elastically deformable legs when said end member and said cylindrical member are engaged, and second engaging surfaces which come into contact with said front edge portion of said elastically deformable engaging legs during engagement or disengagement of said end member with said cylindrical member; and said first and second engaging surfaces having oblique angles with respect to each other that are determined such that an elastic restoring force of said elastically deformable legs is stronger when undergoing an operation to connect said end member with said cylindrical member than when said end member and said connecting member are connected;

wherein, when said end member and said cylindrical member are connected, said elastic restoring force biases said front portion of said end member to press against and contact said cylindrical member.

10. A connecting mechanism, comprising:

a first member having a front portion with an elastically deformable portion extending therefrom;

a second member having a flange with an deformable hole;

said first and second members being connected when said elastically deformable portion engages said flange through said engaging hole;

one of said flange and said elastically deformable portion having first and second surfaces at oblique angles to each other such that an elastic restoring force exerted by said elastically engaging portion to said flange when said first surface contacts the other of said flange and said elastically deformed portion is greater than an elastic restoring force applied when said second surface contacts said other of said flange and said elastically deformed portion; and said elastic restoring force biasing said front portion of said first member toward said second member.

11. The connecting member of claim 10, wherein said first and second surfaces are on said elastically deformable leg, and said first member is continuously biased toward said second member by said elastic restoring force applied by said first surface against said flange.

12. The connecting member of claim 10, wherein said first and second surfaces are on said flange, and said first member is continuously biased toward said second member by said elastic restoring force applied by said elastically deformable leg against said first surface.

13. A connecting member for connecting a lens decorative frame to a front end of a lens barrel of a camera, comprising:
- said lens decorative frame including an elastically deformable portion;
- said lens barrel including an inner flange having an engaging hole for receiving a free end of said elastically deformable portion, said engaging hole having a predetermined thickness along an optical axis of a lens of said camera;
- said lens frame connecting to said lens barrel when an edge of said elastically deformable portion engages a contact surface of said engaging hole;
- said contact surface and said deformable portion having shapes such that a force required to fully disengage said lens frame from said lens barrel is greater than a force to partially disengage said lens frame from said lens barrel; and
- said shapes deform said deformable portion such that an elastic restoring force biases said lens frame toward and into contact with a front surface of said lens barrel.

14. The connecting mechanism of claim 13, wherein said lens frame includes an engaging surface which engages a portion of said lens barrel such that said lens frame is placed with said lens barrel, centered about said optical axis, when said lens barrel and lens frame are connected.

15. The connecting mechanism of claim 13, wherein said shapes comprise first and second oblique surfaces on one of said contact surface and said deformable portion.

* * * * *

UNITED STATES PATENT AND TRADEMARK OFFICE
CERTIFICATE OF CORRECTION

PATENT NO. : 5,678,953
DATED : October 21, 1997
INVENTOR(S) : H. USUI et al.

It is certified that error appears in the above-indentified patent and that said Letters Patent is hereby corrected as shown below:

On the cover of the printed patent, in section [73], "Assignee", line 1, change "Asahi Kogaku Kabushiki Kaisha" to ---Asahi Kogaku Kogyo Kabushiki Kaisha---.

Signed and Sealed this

Twenty-fourth Day of March, 1998

Attest:

BRUCE LEHMAN

*Attesting Officer*  *Commissioner of Patents and Trademarks*